US007130722B2

(12) United States Patent
Soni

(10) Patent No.: US 7,130,722 B2
(45) Date of Patent: Oct. 31, 2006

(54) SMART DISCONNECT SWITCH INTERBASE

(75) Inventor: Devendra K. Soni, Maryland Heights, MO (US)

(73) Assignee: Distribution Control Systems, Inc., Hazelwood, MO (US)

( * ) Notice: Subject to any disclaimer, the term of this patent is extended or adjusted under 35 U.S.C. 154(b) by 0 days.

(21) Appl. No.: 11/063,200

(22) Filed: Feb. 22, 2005

(65) Prior Publication Data

US 2006/0190140 A1 Aug. 24, 2006

(51) Int. Cl.
*G05D 11/00* (2006.01)

(52) U.S. Cl. ...................................... 700/286; 700/292

(58) Field of Classification Search ................ 700/286, 700/291, 292, 295, 297, 298

See application file for complete search history.

(56) References Cited

U.S. PATENT DOCUMENTS 5,103,364 A * 4/1992 Kamp ......................... 361/72
5,462,225 A * 10/1995 Massara et al. ............... 236/47
5,576,700 A * 11/1996 Davis et al. ............... 340/3.31
5,696,695 A 12/1997 Ehlers et al.
5,825,664 A * 10/1998 Warrior et al. ................. 700/7
5,880,677 A * 3/1999 Lestician .................... 340/3.1
6,222,147 B1 * 4/2001 Doughty et al. ............ 218/157
6,259,996 B1 * 7/2001 Haun et al. ................... 702/58
6,473,281 B1 * 10/2002 Kornblit ...................... 361/42
6,965,319 B1 * 11/2005 Crichlow ............... 340/870.02
2002/0045993 A1 4/2002 Shincovich
2002/0105435 A1 8/2002 Yee et al.
2005/0104575 A1 5/2005 Yee et al.

FOREIGN PATENT DOCUMENTS

EP 0493964 A2 7/1992

* cited by examiner

*Primary Examiner*—Leo Picard
*Assistant Examiner*—Chad Rapp
(74) *Attorney, Agent, or Firm*—Polster, Lieder, Woodruff & Lucchesi, L.C.

(57) ABSTRACT

Apparatus (10) for controlling supply of electricity through an electrical distribution network to a customer. An electrical meter (12) is plugged into an electrical socket (14) at a customer's premises. Electricity flows from a power line through the socket into the premises, the amount of electricity used being measured by the meter. The apparatus is interposed between the meter and the socket and includes a switch (18) to interrupt flow of electricity into the premises. The switch is controlled by the utility, preferably through programming of the apparatus or through a TWACS® communication system. This enables the utility to selectively control supply of electricity to the premises apart from the flow of electricity to any other premises connected to the same power line (L).

24 Claims, 1 Drawing Sheet

SMART DISCONNECT SWITCH INTERBASE

CROSS REFERENCE TO RELATED APPLICATIONS

None

STATEMENT REGARDING FEDERALLY SPONSORED RESEARCH OR DEVELOPMENT

N/A

BACKGROUND OF THE INVENTION

This invention relates to the supply of electricity by a utility to its customers; and more particularly, to a disconnect switch interbase, or DSI, which is either used as a stand alone unit or often integrated with an electricity meter such as a meter which can be automatically read by the utility, and which enables the utility to remotely control power usage by the consumer through the disconnect switch.

It is well-known in the art that electricity supplied to a house or commercial establishment is routed into the premises through a meter. The meter measures the amount of electricity supplied to the user at the facility and the user pays the utility for the electricity used. This payment is based upon periodic measurements of electrical consumption taken from the meter and a utility bill generated from the meter reading. Recently, electrical utilities have begun using automated or automatic meters which are remotely "read" by the utility, instead of having a utility worker periodically come onto the premises and read the meter as has traditionally happened. A number of automatically read meters, or AMRs, are available, and many are capable of being interrogated (polled) from a remote location. The response provided by the meter identifies the location of the meter and the current electricity consumption at the premises where it is installed. The customer is then billed by the utility based upon the electrical usage output transmitted from the meter.

Sometimes people don't pay their electricity bills. When they don't, the utility, absent special circumstances such as extreme heat in the summer or extreme cold in the winter, is entitled to turn-off electricity to the premises. In the past, when someone's electricity needed to be turned-off, the utility had to send out someone to affect the disconnection. This took time, and sometimes there was a risk involved to the worker. If the overdue bill was subsequently paid, then the crew had to go back out and reconnect the service.

Besides shutting off service for non-payment of a bill, there are other times when a utility needs to control the flow of electricity to a building. A common occurrence is in the summer when it gets very hot at the same time there is high humidity. During such times, there is a peak demand for electricity, and occasionally the demand reaches or exceeds the generating capacity of the utility. When this occurs, the utility can try to buy additional electricity from other utilities to cover its shortage, but this is usually expensive, and adjoining utilities typically are experiencing their own shortages. The utility can also request its customers to cut back on their electrical usage during peak periods of consumption. Usually the peak extends from late afternoon when people start coming home and fixing dinner to sometime in the evening when they go to bed. If consumers do not sufficiently reduce their electricity usage during this time, then the utility often has to resort to floating "brown-outs" in which service is reduced for periods of time, first to one segment of the distribution network, and then to another segment, so the overall load on the system does not take the system down.

Other circumstances in which a utility's ability to effectively and efficiently control service to a home or business include providing back-up overcurrent protection in the event a circuit breaker malfunctions, and arc fault circuit back-up protection.

BRIEF SUMMARY OF THE INVENTION

The present invention, briefly stated, is directed to a disconnect switch interbase used in a two-way automated communication system or TWACS® for controlling supply of electricity to customers through an electrical distribution network. An electrical socket is mounted at the customer's premises and an electrical meter is plugged into the socket. Electricity flowing into the premises passes through the meter which measures the electricity usage at that premises. The DSI comprises a switch interposed between the meter and its socket, and associated electronics. The DSI is controlled by commands transmitted through the TWACS to interrupt, when appropriately commanded, the flow of electricity to the premises. This enables the utility to control supply of electricity to the premises separate from the flow of electricity to any of the other premises connected to the same power line.

By enabling a utility to disconnect the premises from the source of power, the utility can shut-off power to delinquent bill paying customers without having to have someone physically go to the premises and shut it off. Similarly, when the bill is paid, electricity supply is restored without someone having to go the premises and turn it back on. In peak loading conditions, the utility can control the flow of electricity to premises throughout its distribution system, independently of electricity users turning off appliances or equipment, thereby keeping the utility on-line.

Other objects and features will be in part apparent and in part pointed out hereinafter/

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the several views of the drawings.

DETAILED DESCRIPTION OF INVENTION

Figures 1, 2:
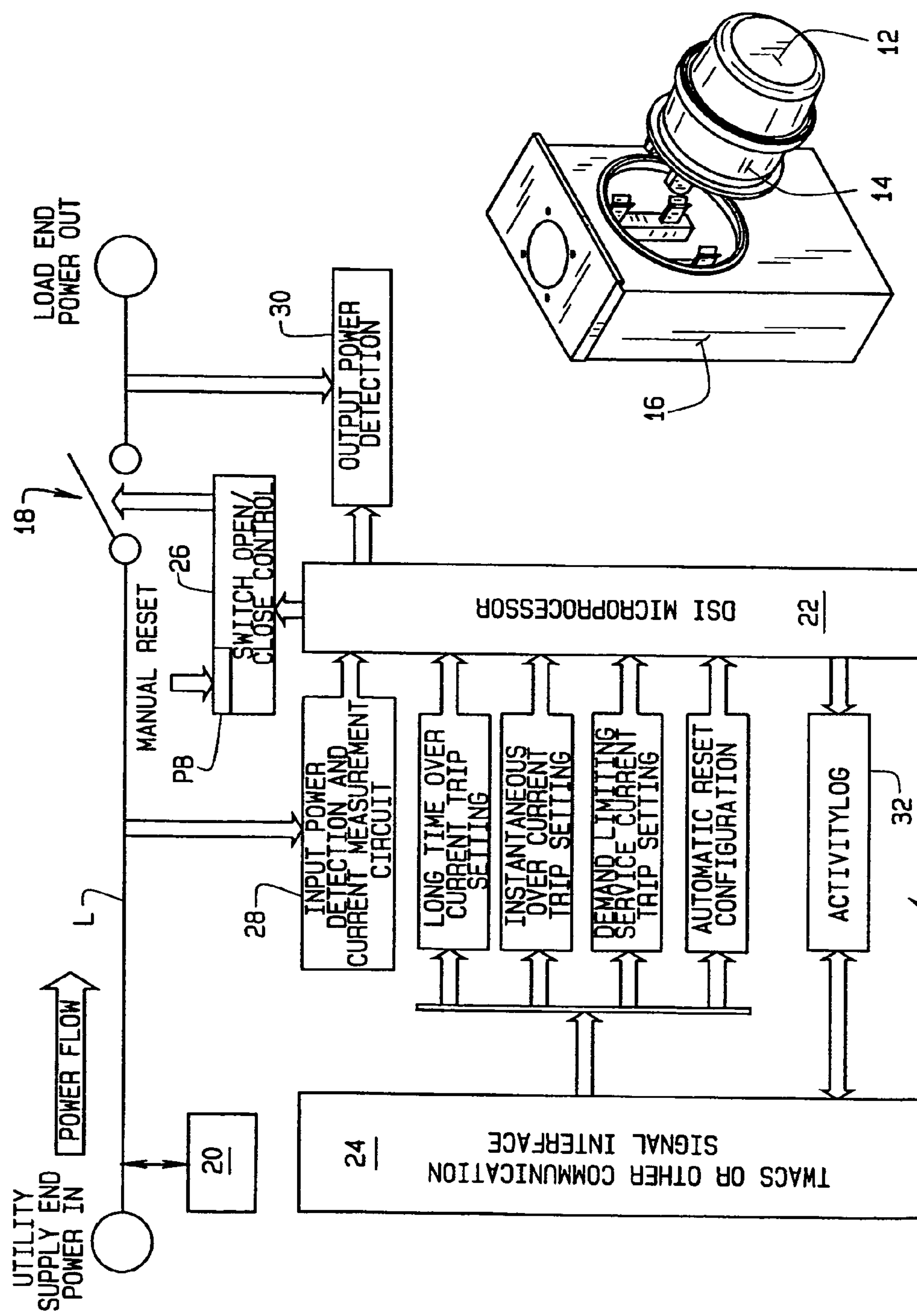
FIG. 1 illustrates an electricity meter with a DSI as installed at a customer's premises; and, FIG. 2 is a block diagram representation of an electrical meter connected to a TWACS system with a DSI connected to the meter.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Referring to the drawings, a disconnect switch interbase or DSI of the present invention is indicated generally 10. The DSI is a remote power line communication transponder used with a two-way automated communications system such as TWACS® for communicating with an AMR type electrical meter 12. As shown in the drawings, the DSI is fitted into a collar 14 which is sandwiched between meter 12 and a socket 16 for the meter. Such sockets are typically located on the side of the building to which electrical service is supplied. Accordingly, DSI 10 comprises an inline component between meter 12 and socket 16. Typically the socket and meter are installed in a side of the premises, with electricity from a power line L (see FIG. 2) being routed to a junction box (not shown) inside the premises. From the junction box, electricity is distributed throughout the premises through one or more breaker controlled electrical circuits. DSI 10 incorporates a contactor type switch 18 which is normally closed, but when open, disconnects electrical service to the entire premises serviced by the utility. Thus, in a typical electrical service line L, DSI 10 connects or disconnects the load (user or customer) end of the line from the utility (supply) end. This is done by closing and opening switch 18.

DSI 10 does not meter electricity or communicate directly with its associated meter 12. It can, however, be addressed independently of meter 12 via the TWACS. The two-way communications are routed from and to the DSI from a master station 20 of the utility. The master station transmits commands or instructions to the DSI over power line L and receives data or confirmation of commands executed from the DSI over the line. If no power is flowing from the utility through line L, DSI 10 cannot communicate with the master station. Further in such circumstances, DSI 10 cannot perform certain operations because it has no auxiliary source of power.

DSI 10 includes a programmed microprocessor 22. The microprocessor is capable of executing a variety of instructions including those transmitted to the DSI from master station 20. It is an important feature of the invention that DSI 10 is remotely programmable to perform these functions by executing commands transmitted to it. While the communications method is preferably through TWACS, those skilled in the art will appreciate that other wireless or hardwired technologies can also be employed. Wireless communications would include radio frequency (rf) communications including paging technology. Wired communications would include power line carriers, telephone and the internet via telephone or cable (including fiber optics). DSI 10 has a communication signal interface module 24 to affect two-way communications between the DSI and the utility's master station.

DSI 10 performs certain basic functions such as input power detection, current measurement, and output power detection. Input power detection provides information by which the status of switch 18 is determined. If power is available at the utility and load ends of line L, then the status of switch 18 is "closed". However, if power is available at the utility end of the line but not the load end, then the status of switch 18 is "open". A third switch status, switch "armed", means the switch is currently "open", but is ready to be manually "closed"; or the DSI is waiting for the time to occur the switch will be closed using a switch control module 26.

Microprocessor 22 receives inputs from both an input power detection module 28 and an output power detection module 30. The input Power detection involves voltage measurements on the supply end of the DSI. Output power detection, voltage measurement on the load end of the DSI 10, is performed to determine the availability of power at the load end of the DSI 10. This is done for determining the status of switch 18 as being either open or closed when power is available at the supply end of the switch. A secondary purpose of output power detection is to determine whether or not the switch is operating normally, or if it is malfunctioning or has been tampered with. Further, a current measurement is also performed on the supply side of the DSI 10 using a current transformer or other means for line current measurements such as a Hall-effect sensor, measurement of voltage drop across a resistor, or a current transducer, etc. The load current through line L is continuously monitored and compared with predetermined reference settings. Microprocessor 22 then makes appropriate control decisions in accordance with its programming.

In addition to those functions described above, DSI 10 also performs a variety of other functions. One of these is instantaneous over current trip setting by which the DSI stores various settings which will cause the DSI to trip switch 14 and disconnect the power supply from the load, if a particular current value setting is exceeded under a particular set of operating conditions. It will be understood that the settings, often called "pick-up" or "operating current reference", are programmed into the DSI during manufacture, but that they can be adjusted or changed in response to a command from master station 20. During operation, when actual load current, which is continuously monitored as described above, exceeds the programmed setting, DSI 10 will 'trip' switch 18. This disconnects supply of electricity to the premises and the action is called an instantaneous over current trip because the DSI trips the switch immediately when the load current exceeds the preset reference. For example, switch 18 is capable of carrying 200 amps. However, if the instantaneous over current trip is set at 100 amps, then DSI 10 instantaneously trips the switch when the load current detected exceeds this 100 amps value. Although referred to as instantaneous, tripping switch 18 does take a finite amount of time.

Another function performed by DSI 10 is storing various settings relating to long time over current trip setting. Again these settings are initially entered into the DSI during manufacture, but can be subsequently modified by a command from master station 20. In operation, DSI 10 should not trip switch 18 when an over current condition is transient; e.g., a brief current surge caused by a motor starting, or some other type of short time duration, sudden current overload. Accordingly, an intentional time delay is incorporated into the DSI which allows a current several times in excess of the set value to persist for predetermined, limited time period without switch 18 being tripped by the DSI. In this regard, DSI 10 can be programmed to initiate tripping of switch 18 more quickly as the over current more quickly increases, thereby providing an inverse-time tripping capability. Accordingly, the time delay is short if the magnitude of over current is high (for example, 200% of the normal current), but slightly longer if the over current is relatively low (for example, 120% of the normal current). The various settings programmed into the DSI result in a family of time current operating curves, as well the conditions under which a particular time current operating curve is used. Generally, the pick-up settings are in the range of 40%–120% of the switch rating of 200 amps; although, these can be modified to suit customer requirements. Current trip settings of 400%

(or higher) entered into the DSI result in a short than a long time over current trip setting.

It will be understood by those skilled in the art that DSI 10 is also capable of implementing complex over current trip control strategies coupled, for example, to the time of day. This is because power usage varies throughout the day. Again, the settings and parameters on which they are based are initially programmed into the DSI, but can be subsequently modified through communications with master station 20.

When the DSI trips switch 18, the switch latches in its "open" position, thereby disconnecting the supply of electricity to the consumer. The switch must now be reset to re-establish the supply of electricity. In addition to causing an automatic trip of switch 18 under the conditions described above, DSI 10 is also programmed to automatically reset the switch and to do so in accordance using different control strategies.

A first strategy is for a time-delayed, automatic reset. Using this strategy, switch 18, once tripped, is automatically reset by the DSI after a predetermined time delay. This delay is programmed into the DSI, but may remotely be changed by a command from master station 20. A disadvantage with this reset strategy is that all the loads at the consumer end of the power line are powered up upon reset and it may not always be safe to turn back on all the power consuming appliances. For example, if heavy loads produced by the appliances initially caused switch 18 to trip, once they are again powered, they may almost instantaneously cause a new trip of the switch.

A second strategy is for a time-delayed, automatic reset to arm. In accordance with this strategy, once switch 18 trips, DSI 10 automatically resets the switch after the predetermined time interval. However, this does not automatically restore power to the premises. Rather, the DSI only "arms" switch 14 to be reset. Actual closure of the switch requires manual actuation of a push button PB located at the premises. This reset feature is important because it allows the customer to switch-off undesired loads before restoring power to the premises. Again, the delay time is programmed into the unit but can be changed using a command from the master station.

A third power restoration strategy is a variation of the second. Under this strategy, DSI 10 will again arm switch 18 to be reset at the end of a predetermined period of time after the switch trips. However, the DSI is programmed to not allow the switch reset to occur during peak periods of power usage. Rather, switch 18 can be manually reset only during off-peak hours. The switch is still closed by the customer actuating push button PB; but, when the customer does so, module 26 will not allow the switch to close unless an indication is received from microprocessor 22 that it is an off-peak load time period. The importance of this reset strategy is that while it allows the customer to switch-off undesired loads before restoring powering up the premises, it further insures that even those loads which remain powered will not overload the system when power is restored. The delay time, as well as the off-peak time periods are programmed into the DSI, but can be changed via a command from the master station.

A further strategy is to have master station 20 control the arm-to-reset of switch 18. This means that once switch 18 trips, DSI 10 cannot automatically reset the switch using any of the strategies previously discussed. Instead, the customer must report tripping of the switch and the resultant power outage to the utility company. If there are any matters between the customer and utility (such as non-payment, or chronic late payment, of utility bills), only after these are resolved with the utility send a command, through the master station, to enable the DSI to arm the switch so it can be reset. Once the command is sent, the customer close switch using the on-site push button.

Another strategy is demand limiting service current trip setting. This strategy allows the utility to use commands from master station 20 to remotely configure various parameters related to demand limiting service. For example, to avoid "brown-outs" , the utility can program DSI 10, through the master station, to change the current trip point of each customer. Thus, during a peak usage period, one power consumer, a hospital, for example, may have no change at all to their level of usage; while, a family dwelling may have their service set at a drastically reduced level, so they may be only able to run an air conditioner and some minor appliances, rather than the air conditioner, clothes washer and dryer, etc. which consume substantial amounts of energy. Each consumer's DSI can be separately programmed to accommodate the different energy usage requirements known to the utility about that consumer.

Other, more complex master station control strategies can also be implemented by the DSI. For example, DSI 10 can combine two of the controls strategies described above such as the time delay automatic reset to arm with the master station controlled reset to arm. This combination of strategies enables the utility to allow a customer the ability to time delay the automatic arm-to-reset to a predetermined number of times per day, or per week, or per billing period. As such, it allows the utility to control consumer behavior. Thus, if a consumer continually uses too much electricity during peak demand periods, the utility can prevent him from re-establishing supply of electricity to his premises after an outage. This enables the utility to affect customer behavior if it does not change after his being notified that his level of usage is unacceptable for a given set of conditions. Now, the utility controls the customer's energy usage through commands issuing from master station 20.

Other situations where this combination of strategies can be employed is for a consumer who is negligent is paying his utility bills, but because of conditions such as extreme heat or cold, the utility cannot shut off his power since he could not then run his air conditioner or furnace. In these instances, the utility can monitor the amount of usage so that if the consumer starts to use more electricity than is it known is needed to operate his air conditioner or furnace, or in general the minimum surviving loads, the power to the premises is shut-off automatically. The DSI 10 is armed instantaneously or with a time delay as per the programming, so that the customer can restore power to the premises by actuating the local push button PB. In order that the DSI 10 does not trip again, the customer must reduce the load within the acceptable limits. Utility can also devise other complex business rules for allowing the power restoration control to the customer.

DSI 10 further includes an activity log 32 which is maintained, for example, in the non-volatile memory portion of the DSI. Recorded in activity log 32 is each important activity which occurs at the premises. This includes, but is not limited to, the date and time of a "trip" event; the date and time of a subsequent "arming"; the date and time of a "reset"; and the date and time of configuration or reconfiguration command received from the master station. The master station can retrieve the contents of the activity log at any time, this being done on a regularly scheduled basis. Once activity log information has been down loaded from the DSI to the master station, the relevant portion of the DSI's memory is erased so new activity log information can now be entered. If desired, DSI 12 can maintain activity log information on a permanent basis. In this event, master station 20 will mask the downloaded or "read" data in the activity log so this information it is not downloaded each time more recorded data is retrieved. However, if necessary, the entire contents of the activity log can be retrieved using a special set of commands from the master station, or by connecting specialized information retrieval equipment to a port of the DSI.

When configured as described above, DSI 10 performs a number of functions. Among these are: 1) limiting demand; 2) demand side peak load management; 3) over current back-up protection; 4) fuse-less over current back-up protection; and, 5) arc fault circuit interrupter (AFCI) back-up over current protection. Certain aspects of these features have been discussed above.

An important feature of DSI 10 is that it incorporates a demand limiting service or DLS. This feature allows the utility to precisely control the amount of power supplied to any premises where a meter 12 with DSI 10 is installed. The control capability provided by DLS includes the ability to totally shut-off power to a customer for non-payment or delinquency in paying his utility bill. Whereas, before, the utility was limited to making warning calls to the customer, and then shutting-off his power if he still did not settle his account, DLS now allows the utility greater latitude in this regard. So, for example, the utility can limit power usage rather than totally shutting-off the power to a delinquent customer. This is especially helpful where the utility is prevented by law or humanitarian reasons for completely shutting off power; particularly in areas with very cold weather or during wintertime, but where the utility should not have to supply more power than is needed by the customer to run a furnace or heaters.

Another advantage of DLS is that it allows the utility to reach an agreement with a customer over the level of service. If the customer is a delinquent bill payer, the utility can negotiate a limited level of continued service with the customer until the delinquency is cleared up. Similarly, during high peak demand periods, the utility and customer can have an agreement as to the level of service during identified peak periods whereby the customer agrees to limit his electricity usage for a set interval (e.g., 4P.M.–10P.M., if the temperature exceeds 100° F. or the heat index exceeds 105° F.). The utility can then issue commands to DSI 10 to trip if, for example, a 40 amp long-time over current limit is exceeded, or if a 50 amp instantaneous over current limit is exceeded. In either event, if the customers exceeds their agreed to level of use (whether intentionally or not), the utility can automatically shut-off service through a command from master station 20 to DSI 10 for a fixed period of time (e.g., 1 hr), and then automatically restore the service with a second command. The second command would be a reset-to-arm command which would then require the customer to manually reset switch 18 using pushbutton PB.

The advantages of this method of service monitoring and control is that it enables the utility to automatically control electricity supply to a customer, in accordance with both customer agreements and any relevant laws or regulations.

Back-up over current protection is used in conjunction with over current protection devices normally installed at a user's premises. Such devices include, for example, circuit breakers. In this back-up mode, if an electrical overload occurs, the expectation is that the installed devices would handle the event, first shutting-off power within the premises and then be appropriately cycled to restore power. However, DSI 10 can be programmed, in accordance with the load requirements at the customer's site, to trip switch 18 and interrupt power supply to the premises if the installed equipment fails for any reason.

Next, arc fault circuit interrupters (AFCIs) are now being installed at premises to protect against equipment damage, fires, and possible harm to people. An arc fault can be described as an unintentional electrical discharge characterized by a low, erratic level of current. Because current levels associated with an arc fault are usually well below those levels which would normally trigger a circuit breaker or fuse, they are typically not detected by standard circuit breakers. An AFCI, for example, comprises an electronic circuit installed with a standard circuit breaker to detect arc faults. If the circuit detects arcing, it affects tripping of the circuit breaker and signifies a fault condition so the condition can be identified and fixed. DSI 10 can be programmed as a back-up to the detection circuit. In this application, when the DSI detects a current whose characteristics signify a possible fault, the DSI trips switch 18 and sends an arc fault indication to master station 20. It will be understood by those skilled in the art that DSI 10 interrupts power to the load represented by the premises, even though there may be no over current situation.

Finally, the overall importance of the invention is that it provides an apparatus 10 for controlling supply of electricity through an electrical distribution network to a customer. An electrical meter 12 is plugged into an electrical socket 14 at a customer's premises. Electricity flows from a power line through the socket into the premises, the amount of electricity used being measured by the meter. The apparatus is interposed between the meter and the socket and includes a switch 18 to interrupt flow of electricity into the premises. The switch is controlled by the utility, preferably through programming of the apparatus or through a TWACS® communication system. This enables the utility to selectively control supply of electricity to the premises apart from the flow of electricity to any other premises connected to the same power line L.

In view of the foregoing, it will be seen that the several objects and advantages of the present invention have been achieved and other advantageous results have been obtained.

Having thus described the invention, what is claimed and desired to be secured by Letter Patent is:

1. Apparatus for controlling supply of electricity through an electrical distribution network to a customer comprising:

an electrical socket at a customer's premises through which electricity flows from a power line into the premises;

an electrical meter plugged into the socket and through which the electricity passes as it flows into the premises for the meter to measure the amount of electricity usage at the premises;

switch means interposed between the meter and the socket and operable to interrupt flow of electricity into the premises, the switch means being controlled by an utility whereby the utility can selectively control supply of electricity to the premises apart from the flow of electricity to any other premises connected to the same power line; and, processor means controlling the switch means to selectively control supply of electricity to the premises apart from the flow of electricity to any other premises connected to the same power line, the processor means being responsive to current usage at the premises to provide over-current tripping of the switch means to interrupt power input to the premises if the current exceeds a predetermined current value for a particular set of operating conditions at the premises and the duration of the over-current conditions extends beyond a predetermined time interval, which interval is a function of the amount by which the over-current exceeds the predetermined current value whereby the interval is shorter the more the over-current exceeds the value.

2. The apparatus of claim 1 in which the switch means is operable to interrupt and restore the flow of electricity into the premises under control of the processor means.

3. The apparatus of claim 2 in which the processor means is programmable to operate the switch means to interrupt or restore the flow of electricity based upon predetermined criteria for interrupting or restoring power to the customer.

4. The apparatus of claim 3 further including a two-way communications system in which communications are sent back and forth between the utility and the electrical meter over the utility's power lines to control operation of the switch means, and the switch means is responsive to commands transmitted by the utility to the apparatus to operate the switch means to interrupt and restore the flow of electricity, or to modify the predetermined criteria upon which the switch means is operated to interrupt or restore the flow.

5. The apparatus of claim 4 in which the two-way communications system is an automated communications system.

6. The apparatus of claim 1 further including means determining the status of the switch means by detecting power input to the premises, whereby if power is available at the utility and premises, the switch means is closed, but if power is available at the utility but not at the premises, the switch means is open.

7. The apparatus of claim 1 further including manually operable means for closing the switch means to restore power to the premises, the apparatus first having to place the switch means in an arm-to-reset status before the switch means can be closed.

8. In an electrical meter through which electricity passes as it flows from a utility into a premises, the meter measuring the amount of electricity usage at the premises, a disconnect switch interbase (DSI) comprising:

switch means operable to interrupt or restore flow of electricity into the premises; and, processor means controlling the switch means to selectively control supply of electricity to the premises apart from the flow of electricity to any other premises connected to the same power line, the DSI measuring current usage at the premises and providing over-current tripping of the switch means to interrupt power input to the premises if the measured current exceeds a predetermined current value for a particular set of operating conditions at the premises and the duration of the over-current conditions extends beyond a predetermined time interval, which interval is a function of the amount by which the over-current exceeds the predetermined current value whereby the interval is shorter the more the over-current exceeds the value.

9. The DSI of claim 8 in which the processor means is programmed to operate the switch means to interrupt or restore the flow of electricity based upon predetermined criteria established by the utility for interrupting or restoring power to a customer.

10. The DSI of claim 9 which is responsive to commands transmitted by the utility to operate the switch means to interrupt or restore the flow of electricity, or to modify the predetermined criteria upon which the switch means is operated to interrupt or restore the flow.

11. The DSI of claim 10 in which the status of the switch means is determined by detecting a power input to the premises; whereby, if power is available at the utility and the premises, the switch means is closed, but if power is available at the utility but not at the premises, the switch means is open.

12. The DSI of claim 8 for substantially instantaneously tripping the switch means to interrupt power input to the premises if the measured current exceeds the predetermined current value for a particular set of operating conditions at the premises.

13. The DSI of claim 8 for measuring current usage of the premises and providing over-current tripping of the switch means to interrupt power input to the premises as a function of the power usage at the premises and the time of day thereby to couple power usage at the premises to variations in demand for electricity at different times during the day.

14. The DSI of claim 8 for resetting the switch means, so electricity is restored to the premises, only after a predetermined time delay.

15. The DSI of claim 14 for arming the switch means to be reset after the predetermined time delay, and means by which a customer resets the switch means after it is armed.

16. The DSI of claim 15 for arming the switch means to be reset after the predetermined time delay, but not allowing the switch to be reset during peak periods of energy demand on the utility.

17. The DSI of claim 15 in which the customer is prevented from resetting the switch means after it is armed, until the customer has first contacted the utility.

18. The DSI of claim 8 which is responsive to a command from the utility to separately configure each premises at which a DSI is installed to set a current trip point for each premises which may vary from that of other premises thereby to limit demand on the utility by each premises as a function of an energy usage demand of each customer.

19. The DSI of claim 18 by which separately limiting the demand placed on the utility by each customer avoids loss of service from the utility during peak energy demand periods.

20. The DSI of claim 8 for establishing a current limit for the premises of a non-paying customer to prevent the customer from using appliances other than those which the utility is required to allow the customer to use, and to interrupt power to the customer is the current limit is exceeded.

21. The DSI of claim 20 further including arming the switch means to be reset after power to the premises is interrupted, and means by which a customer resets the switch means after it is armed, the customer being prevented from reselling the switch means after it is armed, until the utility is first contacted and the customer is apprised of his use of appliances in addition to those which the utility is required to allow him to use.

22. The DSI of claim 8 used in conjunction with a current protection means installed at the premises to interrupt power in event of an overload, the DSI measuring current usage of the premises and providing over-current tripping of the switch means to interrupt power input to the premises if the current protection means fails when an overload occurs.

23. The DSI of claim 8 used in conjunction with an arc current fault interrupter means installed at the premises to interrupt power in event of an unintentional, low current level electrical discharge, the DSI monitoring current usage of the premises and providing over-current tripping of the switch means to interrupt power input to the premises if the interrupter means fails when an electrical discharge occurs.

24. The DSI of claim 8 further including an activity log for recording information related to the tripping, resetting, and arming of the switch means.

* * * * *